US007688326B2

(12) United States Patent
Cho et al.

(10) Patent No.: US 7,688,326 B2
(45) Date of Patent: Mar. 30, 2010

(54) APPARATUS, MEDIUM, AND METHOD FOR CORRECTING COLOR OF AN IMAGE

(75) Inventors: Minki Cho, Seoul (KR); Dusik Park, Gyeonggi-do (KR); Wonhee Choe, Gyeongsangbuk-do (KR); Cheonyong Cho, Gyeonggi-do (KR); Changyeong Kim, Gyeonggi-do (KR); Seongdeok Lee, Gyeonggi-do (KR); Hyunwook Ok, Gyeonggi-do (KR); Daewon Kim, Gyeonggi-do (KR); Hoyoung Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1016 days.

(21) Appl. No.: 11/093,258

(22) Filed: Mar. 30, 2005

(65) Prior Publication Data

US 2005/0231741 A1    Oct. 20, 2005

(30) Foreign Application Priority Data

Mar. 30, 2004    (KR) ..................... 10-2004-0021818

(51) Int. Cl.
*G09G 5/00*    (2006.01)
*G09G 5/02*    (2006.01)

(52) U.S. Cl. .................. 345/581; 345/589; 345/590; 345/594; 345/619

(58) Field of Classification Search ................ 345/590, 345/593, 594, 596, 597, 599, 617
See application file for complete search history.

(56) References Cited

U.S. PATENT DOCUMENTS 5,483,259 A    1/1996    Sachs 5,754,222 A    5/1998    Daly et al.

(Continued)

FOREIGN PATENT DOCUMENTS

EP    0 313 796    5/1989

(Continued)

OTHER PUBLICATIONS

European Search Report issued Mar. 4, 2008 in corresponding European Patent Application No. 05251888.3-2202.

(Continued)

*Primary Examiner*—Kee M Tung
*Assistant Examiner*—Jacinta Crawford
(74) *Attorney, Agent, or Firm*—Staas & Halsey LLP

(57) ABSTRACT

An apparatus, medium, and method for correcting color of an image. The apparatus may includes a user interface which displays each of N reference patches, removes non-gray components from the displayed N reference patches, according to the characteristics of a user's visual system, and outputs the reference patches from which the non-gray components have been removed as adjusted reference patches, a table generator which generates at least one lookup table that has, as addresses, color component values for a current image and stores color component values of the adjusted reference patches as data, and a color corrector which addresses the at least one lookup table using the color component values of the image to read data corresponding to correction information for the color component values of the image and outputs the read data as the result of the correcting of color of the image.

27 Claims, 6 Drawing Sheets

U.S. PATENT DOCUMENTS

| | | | |
|---|---|---|---|
| 6,078,309 | A | 6/2000 | Chen et al. |
| 6,686,953 | B1 | 2/2004 | Holmes |
| 6,919,905 | B2 * | 7/2005 | Moroney .................... 345/589 |
| 2003/0133609 | A1 * | 7/2003 | Ubillos et al. ............... 382/167 |
| 2004/0227769 | A9 * | 11/2004 | Edge et al. .................. 345/600 |
| 2005/0116961 | A9 * | 6/2005 | Edge et al. .................. 345/600 |

FOREIGN PATENT DOCUMENTS

| | | |
|---|---|---|
| JP | 11338443 | 10/1999 |
| KR | 10-2000-0047589 | 7/2000 |
| WO | WO 99/56088 | 11/1999 |

OTHER PUBLICATIONS

Jung-Kuei Chen et al., "An N-Best Candidates-Based Discriminative Training for Speech Recognition Applications", IEEE Transactions on Speech and Audio Processing, vol. 2, No. 1, pp. 206-216, Jan. 1994.

Korean Patent Office Action for corresponding Korean Patent Application No. 10-2004-0021818.

* cited by examiner

APPARATUS, MEDIUM, AND METHOD FOR CORRECTING COLOR OF AN IMAGE

CROSS-REFERENCE TO RELATED APPLICATIONS

This application claims the benefit of Korean Patent Application No. 10-2004-0021818, filed on Mar. 30, 2004, in the Korean Intellectual Property Office, the disclosure of which is incorporated herein in its entirety by reference.

BACKGROUND OF THE INVENTION

1. Field of the Invention

Embodiments of the present invention relate to an image display apparatus, medium, and method for displaying an image, and more particularly, to an apparatus, medium, method for correcting color of an image.

2. Description of the Related Art

In general, when the gamma characteristics of red (R), green (G), and blue (B) channels are the same in an image display device, gray components of an image to be displayed via the image display device do not include non-gray components. However, in most image display devices, each of the gamma characteristics of R, G, and B channels are not identical. Thus, gray components of an image to be displayed include non-gray components. Accordingly, in a conventional color-correcting method, the color reproduction characteristics of an image display device are found by using a colorimetric apparatus, and then non-gray components are removed from gray components of an image using the color reproduction characteristics.

Consequently, the conventional color-correcting method has a disadvantage in that a user of an image display device cannot correct the gray color reproduction characteristics of the image display device without a high-priced calorimetric apparatus.

SUMMARY OF THE INVENTION

Embodiments of the present invention include an image color-correcting apparatus, medium, and method for adjusting the characteristics of an image display device using only the characteristics of a user's visual system to correct color of an image using the adjusted characteristics of the image display device.

To achieve the above and/or other aspects and advantages, embodiments of the present invention set forth an apparatus for correcting color of an image, the apparatus including a user interface to display each of N reference patches, with N being a number greater than or equal to 1, to remove a non-gray component from a displayed reference patch based on user interaction and according to characteristics of the user's visual system, as an adjusted reference patch, and to output the adjusted reference patch, a table generator to generate at least one table including color component values, as addresses, and storing color component values of the adjusted reference patch as data in the at least one table, and a color corrector to address the at least one table, using color component values of the image, to read data corresponding to the color component values of the image and output the read data for a color corrected image.

The user interface may include a luminance manipulator to be manipulated by the user to match a luminance of the displayed reference patch with a luminance of a paired displayed background, a color component manipulator to be manipulated by the user to remove the non-gray component from the displayed reference patch, and an adjusted reference patch generator to generate the adjusted reference patch for the displayed reference patch based on the luminance manipulation and the color component manipulation.

The color component manipulator may include a gray balance guide map to represent designators of a plurality of chroma components in different locations on a two-dimensional space, and gray balance cursors provided within the displayed reference patch and the gray balance guide map and to be manipulated by the user so as to move the gray balance cursors together an identical distance in an identical direction, wherein, as a gray balance cursor within the gray balance guide map gets closer to an arbitrary designator, a chroma component associated with the arbitrary designator is correspondingly removed from the displayed reference patch. A pattern of the gray balance cursors within the reference patch may also be identical to a pattern of the displayed background.

The user interface may display a plurality of paired reference patches and backgrounds, pair by pair, removes non-gray components from the displayed reference patches, according to the characteristics of the user's visual system, matches luminances of the displayed reference patches with luminances of displayed backgrounds, according to the characteristics of the user's visual system, as adjusted references patches, respectively, and outputs the adjusted reference patches, wherein each of the plurality of pairs includes one predetermined reference patch paired with one predetermined background.

In addition, the displayed background may have a pattern in which at least two of black, white, and gray lines oppose each other. Further, in the displayed background, a number of adjacent lines with a same color may be less than 3 lines.

The table generator may include a gamma matcher to match the luminances of N backgrounds, with color component values the image may have, using a gamma function, and a color component matcher to analyze the gamma matcher matching results, match the color components values the image may have with the color component values of the adjusted reference patches, and output the color component value matching results as at least one table.

The color corrector may include a table reader to address the at least one table, using the color component values of the image, to read the data corresponding to the color component values of the image and output the read data for the color corrected image, and a data generator to, when the at least one table does not include data corresponding to the color component values of the image, predict data corresponding to the color component values using piecewise linear modeling using data from the at least one table, and output results of the prediction for the color corrected image.

To achieve the above and/or other aspects and advantages, embodiments of the present invention set forth a method of correcting color of an image, including displaying each of N, with N being a number greater than or equal to 1, reference patches, removing a non-gray component from a reference patch, according to an interaction by a user and characteristics of the user's visual system, and determining the non-gray component removed reference patch as an adjusted reference patch, generating at least one table that has, as addresses, color component values and stores color component values of the adjusted reference patch as data in the at least one table, and addressing the at least one table, using color component values of the image, to read data corresponding to the color component values of the image and outputting the read data for a color corrected image.

A plurality of pairs of reference patches and backgrounds may be displayed, pair by pair, non-gray components are removed from the displayed reference patches, according to the characteristics of the user's visual system, luminances of the displayed reference patches match with luminances of the displayed backgrounds, according to the characteristics of the user's visual system, as the adjusted reference patches, wherein each of the plurality of pairs includes one predetermined reference patch paired with one predetermined background.

In addition, the outputting of the adjusted reference patches may include initializing a variable n, displaying a paired nth reference patch and an nth background, together, removing a non-gray component from the displayed nth reference patch, according to the characteristics of the user's visual system, determining whether the variable n is equal to N and if it is determined that the variable n is equal to N proceeding to the generating of the at least lookup table, and if it is determined that the variable n is not equal to N increasing the variable n by 1 and proceeding to the displaying of the nth reference patch and the nth background.

Further, the outputting of the adjusted reference patches may include matching a luminance of the nth reference patch with a luminance of the nth background, according to the characteristics of the user's visual system.

To achieve the above and/or other aspects and advantages, embodiments of the present invention set forth a medium including computer readable code implementing embodiments of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
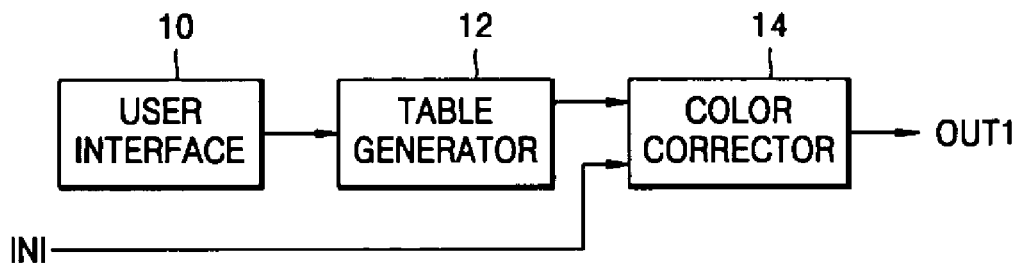
FIG. 1 is a block diagram of an apparatus correcting color of an image, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of an apparatus correcting the color of an image, according to an embodiment of the present invention. Referring to FIG. 1, the apparatus may include a user interface 10, a table generator 12, and a color corrector 14.

The apparatus of FIG. 1 corrects the color of an image displayed on an image display device as follows. Here, the image display device refers to a monitor or the like, for example.

According to an embodiment of the present invention, the user interface 10 can display each of N reference patches on the image display device, remove non-gray components from the displayed reference patches, according to the characteristics of a user's visual system, that is user interaction, and output the reference patches from which the non-gray components have been removed as adjusted reference patches to the table generator 12. Here, N can be a predetermined positive number greater than or equal to "1", where the greater the predetermined positive number, the better, according to an embodiment of the present invention.

According to another embodiment of the present invention, the user interface 10 can display a plurality of pairs of reference patches and backgrounds, one by one. Each background paired with each reference patch can be pre-determined. For example, luminances LB and LP of a paired background and reference patch may have the following relationship of Equation 1:

$$L_B = \frac{L_P}{B}, \quad (1)$$

wherein $L_B$ can be represented by a percentage and B denotes a maximum number of levels of an electric signal used to generate the corresponding different luminance levels, and which may be available for each pixel displayed on the image display device, for example, B may be 255.

The user interface 10 permits a user to remove non-gray components from the reference patches of the displayed pairs, according to the characteristics of the user's visual system, i.e., based on the user's viewed perception, and permits a user to match luminances of the displayed reference patches with luminances of the displayed backgrounds, also according to the characteristics of the user's visual system. Here, the user interface 10 outputs the reference patches, from which the non-gray components have been removed and the luminances have been matched with the luminances of the displayed backgrounds, as adjusted reference patches.

The table generator 12 generates at least one lookup table (LUT) which stores, as addresses, color component values an image may have and as data color component values of the adjusted reference patches, and outputs the generated at least one LUT to the color corrector 14. Here, the color component values may refer to R, G, and B component values. Also, the LUTs for storing the R, G, and B component values, respectively, may be generated separately. For example, the LUT for the R component stores, as addresses, R component values the image may have and R component values of the adjusted reference patches as data.

The color corrector 14 addresses at least one LUT using color component values of an image to be displayed, input via an input node IN1, reads data corresponding to color component values from the at least one LUT, and outputs the read data as the result of a corrected color of the image to be displayed via an output node OUT1.

Figure 2:
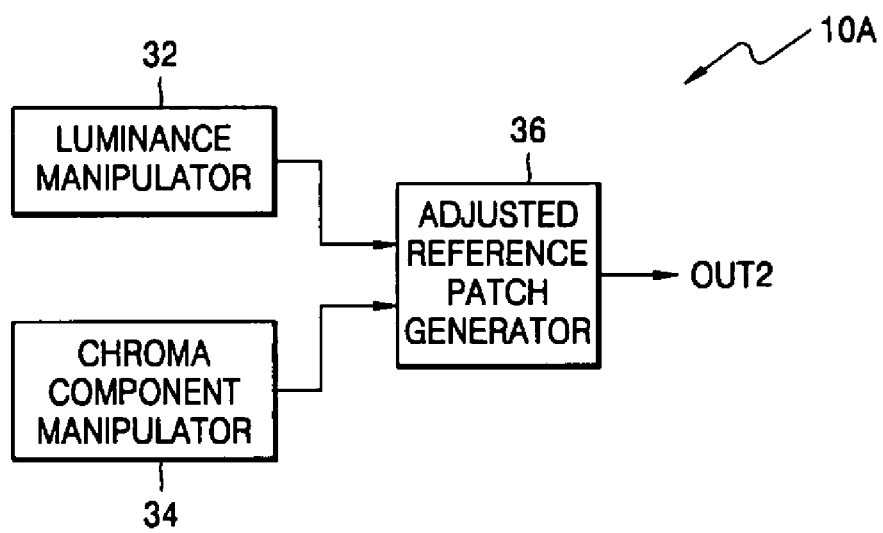
FIG. 2 is a block diagram of a user interface of FIG. 1, according to an embodiment of the present invention.

FIG. 2 is a block diagram of the user interface 10 of FIG. 1, according to an embodiment of the present invention. Referring to FIG. 2, a user interface 10A may include a luminance manipulator 32, a chroma component manipulator 34, and an adjusted reference patch generator 36.

The luminance manipulator 32 is manipulated by a user to match the luminances of the displayed reference patches with the luminances of the displayed backgrounds, paired with the displayed reference patches, and outputs the manipulation results to the adjusted reference patch generator 36. In other words, the user manipulates the luminance manipulator 32 to match the luminances of the displayed reference patches with the luminances of the displayed backgrounds according to the characteristics of the user's visual system.

The chroma component manipulator 34 is manipulated by a user to remove the non-gray components from the displayed reference patches, and outputs the removal results to the adjusted reference patch generator 36. In other words, the user manipulates the chroma component manipulator 34 to remove the non-gray components from the displayed reference patches according to the characteristics of the user's visual system.

The adjusted reference patch generator 36 generates the adjusted reference patches using the reference patches, the luminances of which have been manipulated by the luminance manipulator 32 and from which the non-gray components have been removed by the chroma component manipulator 34, and outputs the adjusted reference patches to the color corrector 14 via an output node OUT2.

Figure 3:
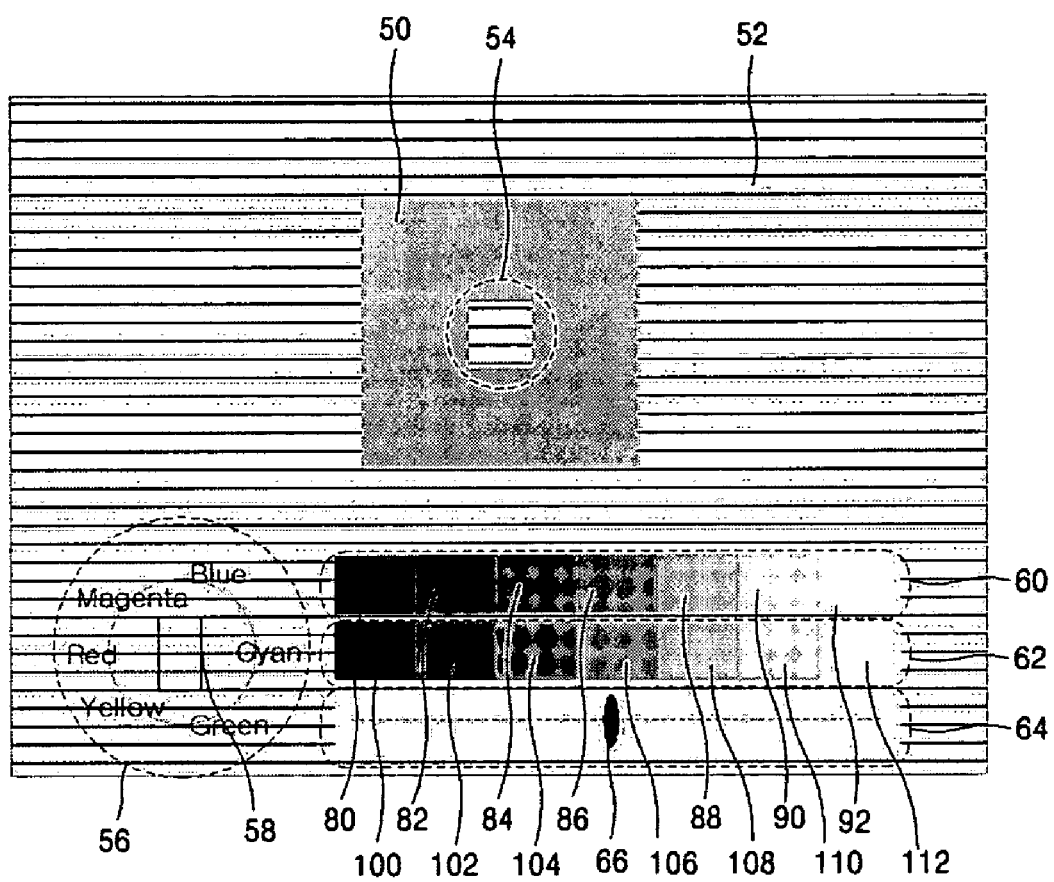
FIG. 3 illustrates a user interface for FIG. 1, according to an embodiment of the present invention.

FIG. 3 is a view illustrating the user interface 10 of FIG. 1, according to an embodiment of the present invention. The user interface 10 includes a reference patch 50, a background 52, gray balance cursors 54 and 58, a gray balance guide map 56, a group of reference patches 60, a group of adjusted reference patches 62, and a luminance manipulating portion 64 having a slide bar 66.

For example, when N=7, as shown in FIG. 3, the group of reference patches 60 includes seven reference patches 80 through 92, and the group of adjusted reference patches 62 includes seven adjusted reference patches 100 through 112.

The gray balance guide map 56 and the gray balance cursors 54 and 58 correspond to the chroma component manipulator 34 of FIG. 2. Here, the gray balance guide map 56 represents designators of a plurality of chroma components in different locations on a two-dimensional space. For example, as shown in FIG. 3, designators of yellow, red, magenta, blue, cyan, and green may be expressed as "Yellow", "Red", "Magenta", "Blue", "Cyan", and "Green". Here, the gray balance cursors 54 and 58 are located in the reference patch 50 and the gray balance guide map 56, respectively, and may be manipulated by the user so as to move them the same distance at the same time and in the same direction. For example, when the user moves the gray balance cursor 58 toward a location of the designator "Red", i.e., in the left horizontal direction, with a pointing device such as a mouse or the like, the gray balance cursor 54 in the reference patch 50 also moves the same distance and at the time as the gray balance cursor 58. As the gray balance cursor 58 in the gray balance guide map 56 approaches an arbitrary designator, a chroma component designated by the arbitrary designator may be gradually removed from the reference patch 50. Alternatively, as the gray balance cursor 58 in the gray balance guide map 56 becomes farther from the arbitrary designator, the chroma component designated by the arbitrary designator may be gradually removed from the reference patch 50.

For example, when the reference patch 50 includes an R component as a non-gray component, the user moves the gray balance cursor 58 in the left horizontal direction toward the designator "Red" until the R component is removed from the reference patch 50. As the gray balance cursor 58 gets closer to "Red", a larger amount of non-gray component, i.e., the R component, is removed from the reference patch 50. Here, the user determines the distance to move the gray balance cursor 58 toward a designator, according to the characteristics of the user's visual system.

The luminance manipulating portion 64 of FIG. 3 corresponds to the luminance manipulator 34 of FIG. 2. For example, the reference patch 50 may become dark or bright according to the left or right movement of the slide bar 66 of the luminance manipulating portion 64. Thus, the user can move the slide bar 66 horizontally, by manipulating the pointing device, to match the luminance of the reference patch 50 with the luminance of the background 52.

In FIG. 3, when the user selects one of the reference patches 80 through 92 of the group of reference patches 60, e.g., by manipulating the pointing device, the reference patch 50 is displayed with the same luminance as the selected reference patch. For example, when the user selects the reference patch 88 from the group of reference patches 60, the reference patch 50 is displayed with the same luminance as the reference patch 88. As described above, the adjustment of the luminance characteristics of the reference patch, through the manipulation of the slide bar 66, and the removal of the non-gray components from the reference patch, through the manipulation of the gray balance cursor 58, results in adjusted reference patches for respective reference patches of the group of reference patches 60. In other words, respective adjusted reference patches of the group of adjusted reference patches 62 are obtained by adjusting the luminance of the reference patch 50 using the luminance manipulating portion 64 and removing the non-gray component from the reference patch 50 using the gray balance cursor 58. For example, when the reference patch 88 is selected to display the reference patch 50, as shown in FIG. 3, the luminance of the reference patch 50 can be adjusted by the luminance manipulator 32, and/or the non-gray component can be removed from the reference patch 50 by the chroma component manipulator 34, thereby generating the adjusted reference patch 108.

According to embodiments of the present invention, the user interface 10 of FIG. 3 does not need to include the group of reference patches 60 and/or the group of adjusted reference patches 62.

Also, the user interface 10 is not limited to the embodiment shown in of FIG. 3. For example, the reference patch 50, the gray balance cursors 54 and 58, the group of reference patches 60, the group of adjusted reference patches 62, the slide bar 66, and/or the gray balance guide map 56 may have various shapes and patterns, and implemented in different manners.

According to embodiments of the present invention, a pattern of the gray balance cursor 54 in the reference patch 50 may be identical to a pattern of the background 52 so that the user can more exactly remove the non-gray component from the reference patch 50.

Moreover, according to embodiments of the present invention, respective backgrounds, which are displayed paired with respective reference patches, by the user interface 10 of FIG. 1, may have a pattern in which at least two of black, white, and gray lines alternate each other. Here, it has been found through experimentation that for lines in the backgrounds adjacent lines in the corresponding reference patches of the same color should be less than "3" lines. This is because it has been found that it is difficult to match a luminance of a reference patch with the luminance of a background, as processed by a user's visual system, when more than or equal to three lines of the same color are adjacent to one another.

Figure 4:
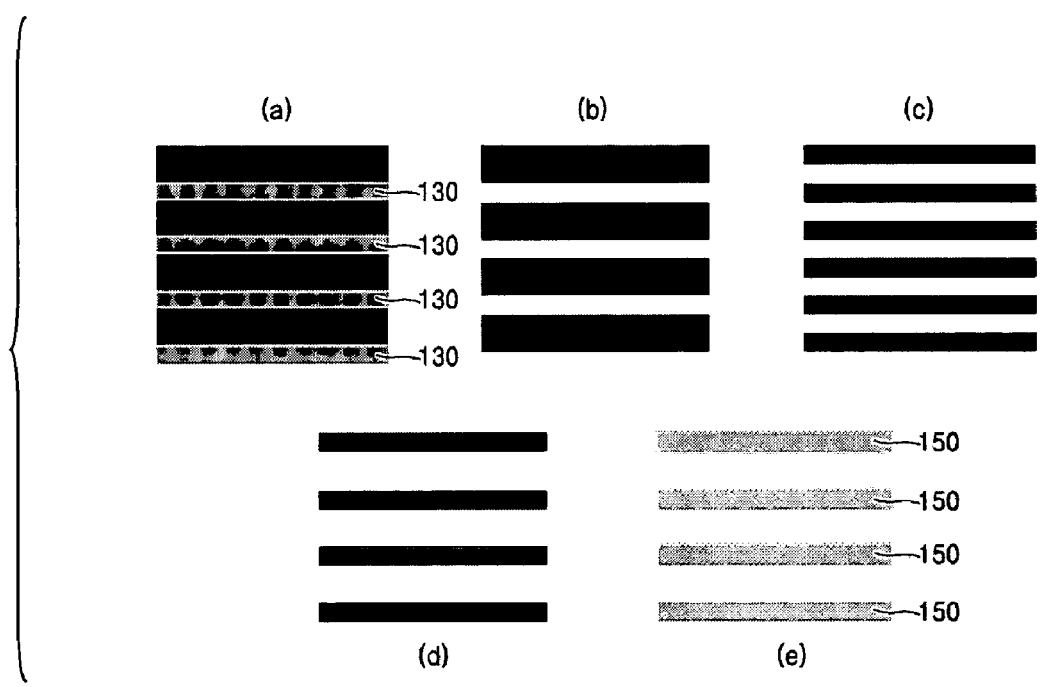
FIG. 4 illustrates examples of backgrounds.

FIG. 4, in illustrations (a) through (e), sets forth examples of backgrounds. Here, reference numbers 130 and 150 denote first and second gray lines, respectively.

When the maximum luminance an image display device can represent is "100", as used in Table 1, luminances of backgrounds may vary depending on the kind and number of lines included in the backgrounds, i.e., the rates of black, gray, and white lines.

TABLE 1

| Classification | Background Luminance (%) | Background Pattern |
| --- | --- | --- |
| First Background | 11.1 | Black Line (2), First Gray Line (1) |
| Second Background | 33.3 | Black Line (2), White Line (1) |
| Third Background | 50.0 | Black Line (1), White Line (1) |
| Fourth Background | 66.7 | Black Line (1), White Line (2) |
| Fifth Background | 88.9 | Second Gray Line (1), White Line (2) |

As shown in Table 1, each of the numbers in the parentheses in the column of "Background Pattern" indicate the number of adjacent lines in each background. In this example, first, second, third, fourth, and fifth backgrounds correspond to backgrounds shown in illustrations (a)-(e), of FIG. 4, respectively.

Here, the first gray lines 130 shown in illustration (a) have the same color component values as color component values of the adjusted reference patch of the reference patch displayed together with the background shown in illustration (b). Accordingly, an adjusted reference patch for the reference patch displayed along with the background of illustration (b) must be obtained prior to the adjusted reference patch of the reference patch displayed together with the background of illustration (a). The dependency of the color component value of the first gray lines 130, included in the background of illustration (a), on the adjusted reference patch of the reference patches displayed with the background of illustration (b) leads to the number of adjacent black lines of illustration (b) being equal to the number of adjacent black lines of illustration (a) and the number of lines between the black lines of illustration (a) being equal to the number of lines between the black lines of illustration (b).

In illustration (e), the second gray lines 150 have the same color component values as the adjusted reference patch of the reference patch displayed with a background of illustration (d). For this purpose, the adjusted reference patch, of the reference patch displayed together with the background of illustration (d), must be obtained prior to the adjusted reference patch for the reference patch displayed along with a background of illustration (e). The dependency of the color component value of the second gray lines 150, included in the background of illustration (e), on the adjusted reference patch of the reference patch displayed together with the background of illustration (d), leads to the number of adjacent white lines of illustration (e) being equal to the number of adjacent white lines of illustration (d) and the number of lines between white lines of illustration (e) being equal to the number of lines between white lines of illustration (d).

Figure 5:
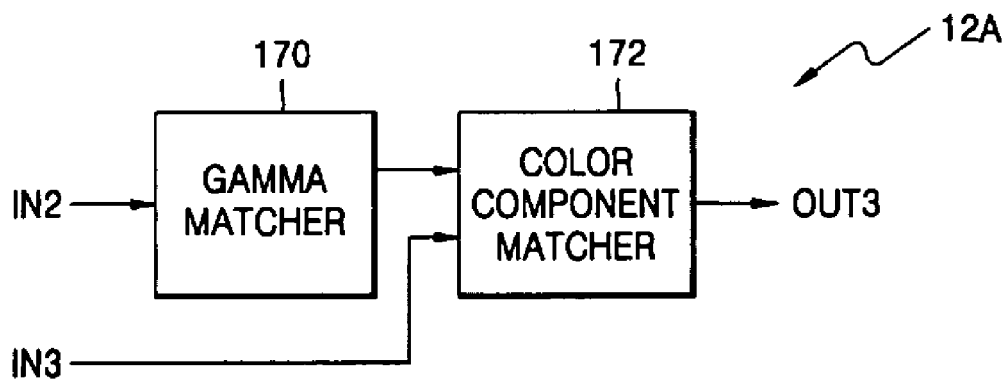
FIG. 5 is a block diagram of a table generator for FIG. 1, according to an embodiment of the present invention.

FIG. 5 is a block diagram of a table generator 12 for FIG. 1, according to an embodiment of the present invention. Referring to FIG. 5, a table generator 12A includes a gamma matcher 170 and a color component matcher 172.

The gamma matcher 170 matches a luminance of each of N backgrounds, which are input from the user interface 10 via an input node IN2, with color component values an image may have, using a gamma function, and outputs the matching results to the color component matcher 172.

For example, luminance Y of each of the N backgrounds may match with a color component value V an image may have, using a gamma function, as follows in Equation 2:

$$Y = \left(\frac{V}{B}\right)^\gamma, \quad (2)$$

wherein Y may be normalized as "1," representing white, or as "0," representing black, and γ denotes the gamma which may be set to "2.2" on standard RGB (sRGB) color space, for example.

The component matcher 172 analyzes the matching results input from the gamma matcher 170, matches the color component values the image may currently have with the color component values of the adjusted reference patch, input from the user interface 10 via an input node IN3, and outputs the matching results as at least one look-up table (LUT) via an output node OUT3.

In this example of the comprehension of the table generator 12A of FIG. 5, it is assumed that N=7, the gamma function is represented as in Equation 2, gamma is set to "2.2", and B=255. In this case, Table 2 may be referred to, to generate LUTs.

TABLE 2

| Classification | Background Luminance | V | R' | G' | B' |
| --- | --- | --- | --- | --- | --- |
| Zeroth Background | 0 | 0 | 0 | 0 | 0 |
| First Background | 0.111 | 94 | R1 | G1 | B1 |
| Second Background | 0.334 | 155 | R2 | G2 | B2 |
| Third Background | 0.505 | 187 | R3 | G3 | B3 |
| Fourth Background | 0.666 | 212 | R4 | G4 | B4 |
| Fifth Background | 0.891 | 242 | R5 | G5 | B5 |
| Sixth Background | 1 | 255 | 255 | 255 | 255 |

It is assumed that in Table 2, R, G, and B color component values V of an image may be the same, and R', G', and B' denote R, G, and B color component values of an adjusted reference patch, respectively. For example, (R', G', B') equaling (0, 0, 0) denotes color component values of a zeroth adjusted reference patch, generated for a zeroth reference patch, paired with a zeroth background, (R', G', B') equaling (R1, G1, B1) denotes color component values of a first adjusted reference patch generated for a first reference patch paired with a first background, (R', G', B') equaling (R2, G2, B2) denotes color component values of a second adjusted reference patch generated for a second reference patch paired with a second background, (R', G', B') equaling (R3, G3, B3) denotes color component values of a third adjusted reference patch generated for a third reference patch paired with a third background, (R', G', B') equaling (R4, G4, B4) denotes color component values of a fourth adjusted reference patch generated for a fourth reference patch paired with a fourth background, (R', G', B') equaling (R5, G5, B5) denotes color component values of a fifth adjusted reference patch generated for a fifth reference patch paired with a fifth background, and (R', G', B') equaling (255, 255, 255) denotes color component values of a sixth adjusted reference patch generated for a sixth reference patch paired with a sixth background.

The gamma matcher 170 of FIG. 5 substitutes results of the gamma function, as in Equation 2, for luminances of seven backgrounds, i.e., zeroth through sixth backgrounds, to calculate color component values V, as shown in Table 2. In other words, the gamma matcher 170 matches luminances of backgrounds with color component values V using a gamma function as shown in Table 2.

Here, seven reference patches, i.e., the zeroth through sixth references patches, are predetermined to be paired with seven backgrounds, i.e., the zeroth through sixth backgrounds, respectively. Therefore, the color component matcher 172 may match color component values R', G', and B' of the adjusted reference patches, which may have been obtained for the respective reference patches through the user interface 10, with the respective color component values V, using the relationship between the luminances of the backgrounds and the color component values V, and with the relationship being the matching result of the gamma matcher 170.

For example, the color component matcher 172 may receive a first adjusted reference patch for a first reference patch paired with a first background, as adjusted through the user interface 10. Here, the color component matcher 172 extracts color component values R1, G1, and B1 of the first adjusted reference patch, matches the extracted color component values R1, G1, and B1 with color component value "94" matched with the first background by the gamma matcher 170, and generates an LUT which has the color component value "94," as an address, storing the extracted color component values R1, G1, and B1 as data. Using such a method, as shown in Table 2, color component values V may be matched with color component values R', G', and B' of the zeroth through sixth adjusted reference patches. For example, a first LUT can be generated using the relationship between the color component values V and the color component values R' as shown in Table 2. A second LUT can be generated using the relationship between the color component values V and the color component values G' as shown in Table 2. A third LUT can be generated using the relationship between the color component values V and the color component values B' as shown in Table 2. Accordingly, the color component matcher 172 can generate the first, second, and third LUTs and outputs the first, second, and third LUTs to the color corrector 14.

Figure 6:
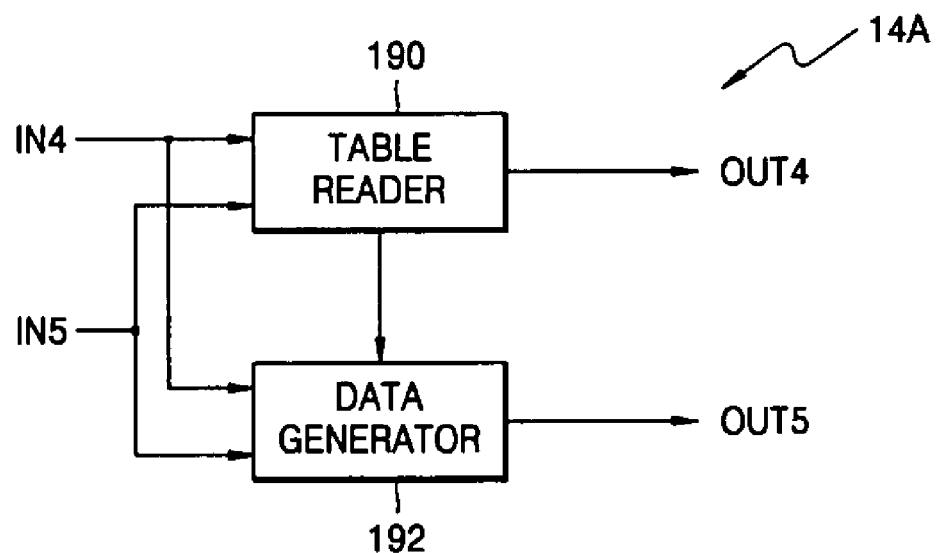
FIG. 6 is a block diagram of a color corrector of FIG. 1, according to an embodiment of the present invention.

FIG. 6 is a block diagram of the color corrector 14, according to an embodiment of the present invention. Referring to FIG. 6, a color corrector 14A can include a table reader 190 and a data generator 192.

The table reader 190 receives at least one LUT from the table generator 12, via an input node IN4, addresses the at least one LUT using the color component values of an image to be displayed, input as the addresses via an input node IN5, to read data corresponding to the color component values of the image, and outputs the read data as the result of the correcting of the color components of the image to be displayed via an output node OUT4.

Here, when the at least one LUT does not include data corresponding to the color component values of the image to be displayed, input via the input node IN5, the data generator 192 can predict data corresponding to the color components values of the image using piecewise linear modeling and output the prediction results as the result of the correcting of the color of the image via an output node OUT5.

According to an embodiment of the present invention, the data generator 192 may look up the at least one LUT, input via the input node IN4, to determine that the at least one LUT does not include data corresponding to the color component values of the image to be displayed. According to an embodiment of the present invention, the data generator 192 may determine that the at least one LUT does not include the data corresponding to the color components values of the image to be displayed, in response to a storage determination signal input from the table reader 190. For this purpose, the table reader 190 may output to the data generator 192 the storage determination signal indicating that the at least one LUT does not include data corresponding to the color components values of the image input via the input node IN5.

For an exemplary comprehension of the color corrector 14A of FIG. 6, it will be supposed in this example that at least one LUT is generated based on Table 2. For example, when color component values, [V(R, G, B)=(94, 94, 94)], of an image are input to an LUT, color component values R1, G1, and B1 can be output as corrected color for the color component values [V(R, G, B)=(94, 94, 94)] from the LUT.

Figure 7:
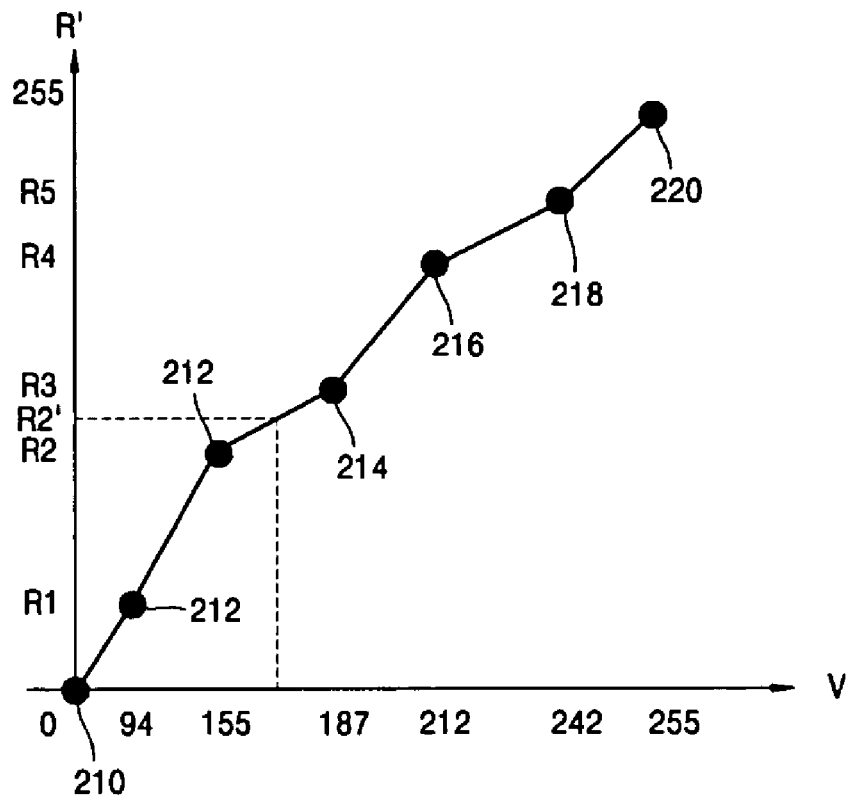
FIG. 7 is an exemplary graph for a first lookup table.

FIG. 7 is an exemplary graph for a first LUT. Referring to FIG. 7, the horizontal axis denotes R component values V a current image may have, and the vertical axis denotes R component value R' of an adjusted reference patch. In other words, the horizontal axis corresponds to addresses of the first LUT, and the vertical axis corresponds to data stored in the first LUT for correcting the current image.

The data generator 192 may obtain such a graph using the first LUT input via the input node IN4. In other words, the data generator 192 may determine the relationship between the color component values V and R' stored in the first LUT, illustrated in the graph of FIG. 7, at points 210, 212, 214, 216, 218, and 220, and then the generator 192 may extrapolate the points, or links between points, 210, 212, 214, 216, 218, and 220 with straight line(s). Here, regarding FIG. 7, the representation of an LUT on a graph and the linking of values which may be derived based on the LUT with straight lines refers to a piecewise linear modeling, for example.

When the LUT does not store data corresponding to a color component value of an image input via the input node IN5, i.e., the color component value V of the image is not included in the color component values shown in Table 2, the data generator 192 may predict data R' corresponding to the corrected color for the color component value V of the image with reference to the graph of FIG. 7. For example, in a case where V=170, since the first LUT does not store data R' corresponding to V=170, data R2' on the graph of FIG. 7 can be predicted as data corresponding to V=170. Here, the data generator 192 can then output the predicted data R2' as the correction result of V=170 via the output node OUT5.

A method of correcting the color of an image, according to an embodiment of present invention, will now be further explained with reference to the attached drawings.

Figure 8:
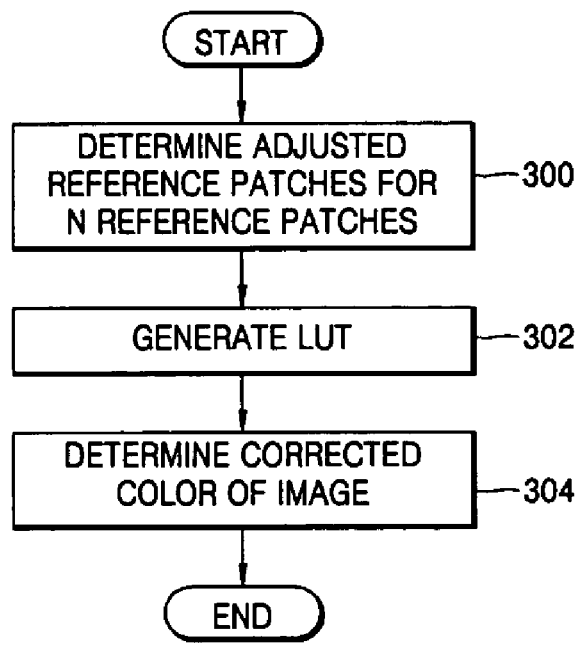
FIG. 8 is a flowchart explaining a method of correcting color of an image, according to an embodiment of the present invention.

FIG. 8 is a flowchart explaining a method of correcting the color of an image, according to an embodiment of the present invention. The method includes operations 300 and 302 of obtaining at least one LUT using adjusted reference patches, obtained according to characteristics of a user's visual system, and operation 304 of correcting color of an image using the at least one LUT.

The method of FIG. 8 may be implemented through the apparatus of FIG. 1, for example. In other words, operations 300, 302, and 304 may be performed by the user interface 10, the table generator 12, and the color corrector 14, respectively.

According to an embodiment of the present invention, in operation 300, each of N reference patches can be displayed, non-gray components can be removed from the displayed N reference patches, according to characteristics of the user's visual system, and the reference patches from which the non-gray components have been removed become adjusted reference patches.

According to another embodiment of the present invention, in operation 300, a plurality of paired reference patches and backgrounds are displayed, pair by pair, non-gray components can be removed from the displayed reference patches, according to the characteristics of a user's visual system, luminances of the displayed reference patches can be matched with luminances of the displayed backgrounds, according to the characteristics of the user's visual system, and the reference patches, from which the non-gray components have been removed and luminances of which have been matched with the luminances of the displayed backgrounds, become the adjusted reference patches.

After operation 300, in operation 302, at least one LUT can be generated, with the LUT having color component values of an image as addresses and include color component values of the adjusted reference patches as data.

After operation 302, in operation 304, at least one LUT is addressed using the color component values of the image, to read data corresponding to the color component values of the image, and the read data can result in the correcting of the color of the image.

Figure 9:
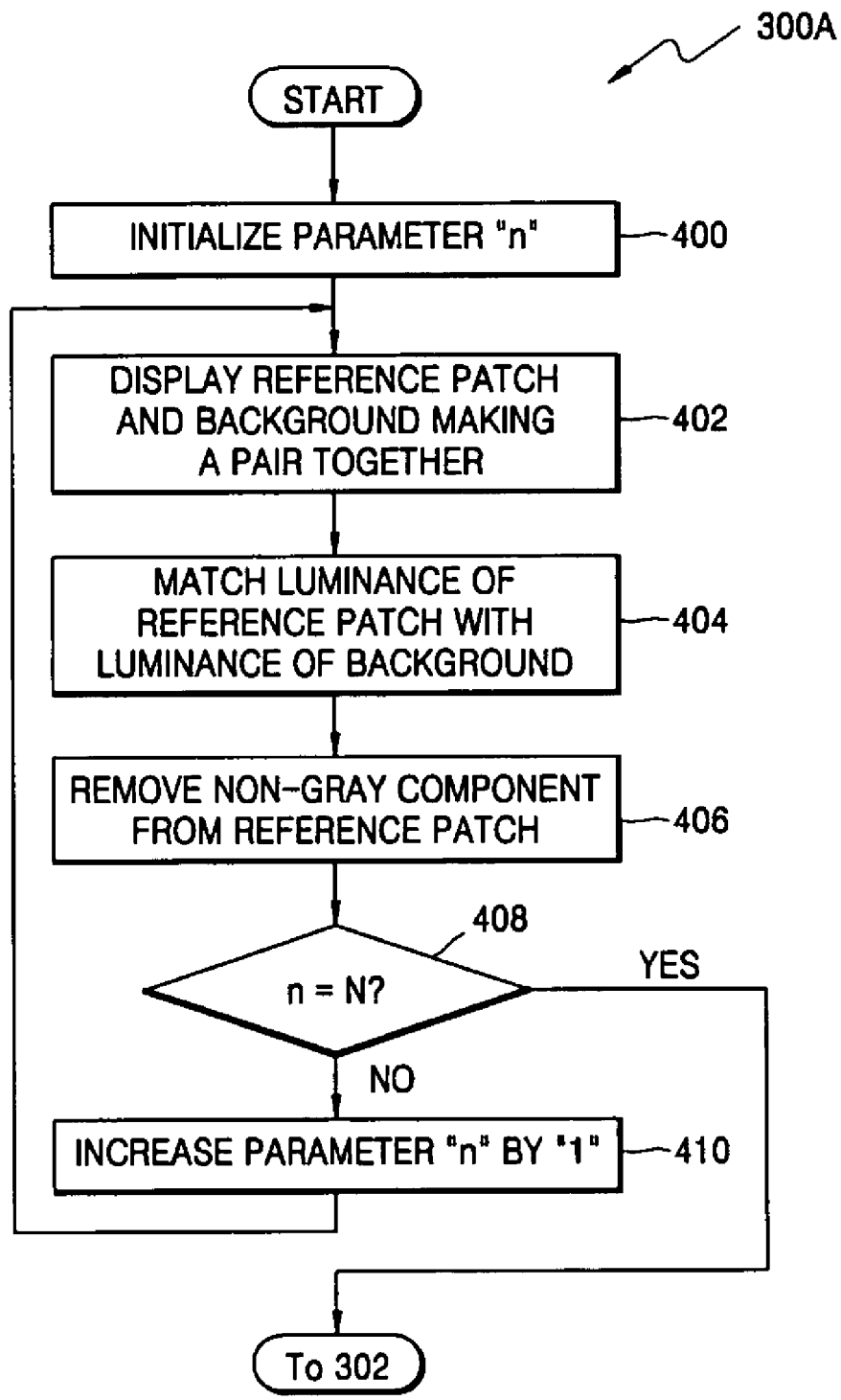
FIG. 9 is a flowchart explaining operation 300 of FIG. 8, according to an embodiment of the present invention.

FIG. 9 is a flowchart for explaining an embodiment 300A of operation 300 of FIG. 8. Operation 300A includes operations 400, 402, 404, 406, 408, and 410 of obtaining adjusted reference patches for reference patches.

According to an embodiment of the present invention, in operation 400, a variable n is initialized to, for example, "1". After operation 400, in operation 402, a paired nth reference patch and nth background is displayed. After operation 402, in operation 404, a luminance of the nth reference patch is matched with a luminance of the nth background, according to the characteristics of the user's visual system, and an adjusted reference patch is generated based on the matching result. For example, a user may determine, according to the characteristics of the user's visual system, whether the luminance of the nth reference patch seems identical to the luminance of the nth background. If the user determines that the luminance of the nth reference patch does not seem identical to the luminance of the nth background, the user may then adjust the luminance of the nth reference patch so as to match with the luminance of the nth background.

After operation 404, in operation 406, a non-gray component may be removed from the displayed nth reference patch, according to the characteristics of the user's visual system, and an adjusted reference patch may be generated based on the removal result. For example, the user may determine, according to the characteristics of the user's visual system, whether the displayed nth reference patch includes the non-gray component. If the user determines that the displayed nth reference patch includes the non-gray component, the user may remove the non-gray component from the nth reference patch up to until the non-gray component is completely removed from the nth reference patch. After operation 406, in operation 408, a determination can be made as to whether the variable n is equal to N. In other words, a determination can be made as to whether operations 404 and 406 have been completely performed on all of reference patches.

If in operation 408, it is determined that the variable n is equal to N, the process moves on to operation 302 to generate an LUT. If in operation 408, it is determined that the variable n is not equal to N, in operation 410, the variable n increases by "1" and the process returns to operation 402 for the next reference patch.

According to another embodiment of the present invention, operation 300A of FIG. 9 may not include operation 404. In this case, operation 406 may be performed after operation 402.

According to yet another embodiment of the present invention, operation 404 of FIG. 9 may be performed not between operations 402 and 406 but between operations 406 and 408. In this case, operation 406 can be performed after operation 402, operation 404 can be performed after operation 406, and operation 408 can be performed after operation 404.

Embodiments of the present invention may be implemented through computer readable code/instructions embodied in a medium, e.g., a computer-readable medium, including but not limited to storage media such as magnetic storage media (ROMs, RAMs, floppy disks, magnetic tapes, etc.), and optically readable media (CD-ROMs, DVDs, etc.). The functional programs, instructions, codes and code segments for implementing the present invention may be easily deducted by programmers in the art which the present invention belongs to after review of the present disclosure.

The above-described image color-correcting apparatus, medium, and method, according to embodiments of the present invention, can be adopted to edit an image displayed on an image display device.

As described above, in an apparatus, medium, and method for correcting the color of an image, luminance characteristics of an image display device can be corrected according to the characteristics of a user's visual system, without using a high-priced colorimetric apparatus. Also, non-gray components, which may be generated during the reproduction of a black and white image, can be removed. For example, with a user interface screen as shown in FIG. 3, a user can relatively easily adjust a reference patch, according to the characteristics of the user's visual system. As a result, the user can conveniently correct the color of an image to be displayed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for correcting color of an image, the apparatus comprising:
   a user interface to display each of N reference patches, with N being a number greater than or equal to 1, to remove a non-gray component from a displayed selected reference patch, of the N reference patches, selectively overlaid on a displayed corresponding background, based on user interaction and according to characteristics of a user's visual system, as an adjusted reference patch, and to output the adjusted reference patch, wherein the user interface includes a user patch manipulator to be manipulated by the user to control display characteristics of the selected reference patch, overlaying the displayed corresponding background, with the user patch manipulator being displayed as an overlay within the displayed selected reference patch;
   a table generator to generate at least one table comprising color component values, as addresses, and storing color component values of the adjusted reference patch as data in the at least one table; and
   a color corrector to address the at least one table, using color component values of the image, to read data corresponding to the color component values of the image and output the read data for a color corrected image,
   wherein the user interface displays a plurality of paired reference patches and backgrounds, pair by pair, removes non-gray components from the displayed reference patches, according to the characteristics of the user's visual system, matches luminances of the displayed reference patches with luminances of displayed backgrounds, according to the characteristics of the user's visual system, as adjusted references patches, respectively, and outputs the adjusted reference patches, wherein each of the plurality of pairs includes one predetermined reference patch paired with one predetermined background.

2. The apparatus of claim 1, wherein the user interface comprises:
   a luminance manipulator to be manipulated by the user to match a luminance of the displayed reference patch with a luminance of a paired displayed background, as the overlaid corresponding background;
   a color component manipulator to be manipulated by the user to remove the non-gray component from the displayed reference patch; and
   an adjusted reference patch generator to generate the adjusted reference patch for the displayed reference patch based on the luminance manipulation and the color component manipulation.

3. The apparatus of claim 2, wherein the color component manipulator comprises:
   a gray balance guide map to represent designators of a plurality of chroma components in different locations on a two-dimensional space; and
   gray balance cursors provided within the displayed reference patch, as the user patch manipulator, and the gray balance guide map and to be manipulated by the user so as to move the gray balance cursors together an identical distance in an identical direction,
   wherein, as a gray balance cursor within the gray balance guide map gets closer to an arbitrary designator, a chroma component associated with the arbitrary designator is correspondingly removed from the displayed reference patch.

4. The apparatus of claim 3, wherein a pattern of the gray balance cursors within the displayed reference patch is identical to a pattern of the displayed background.

5. The apparatus of claim 1, wherein the displayed background has a pattern in which at least two of black, white, and gray lines alternate each other.

6. The apparatus of claim 5, wherein in the displayed background, a number of adjacent lines with a same color are less than 3 lines.

7. The apparatus of claim 1, wherein the table generator comprises:
   a gamma matcher to match the luminances of N backgrounds, with color component values the image may have, using a gamma function; and
   a color component matcher to analyze the gamma matcher matching results, match the color components values the image may have with the color component values of the adjusted reference patches, and output the color component value matching results as at least one table.

8. The apparatus of claim 1, wherein the color corrector comprises:
   a table reader to address the at least one table, using the color component values of the image, to read the data corresponding to the color component values of the image and output the read data for the color corrected image; and
   a data generator to, when the at least one table does not include data corresponding to the color component values of the image, predict data corresponding to the color component values using piecewise linear modeling using data from the at least one table, and output results of the prediction for the color corrected image.

9. The apparatus of claim 1, wherein the user interface further comprises two gray balance cursors respectively provided within the displayed reference patch, as the user patch manipulator, and a gray balance guide map and to be manipulated by the user so as to move the gray balance cursors together an identical distance in an identical direction relative to respective colors mapped in the gray balance guide map.

10. An apparatus for correcting color of an image, the apparatus comprising:
    a user interface to display each of N reference patches, with N being a number greater than or equal to 1, to remove a non-gray component from a displayed reference patch based on user interaction and according to characteristics of a user's visual system, as an adjusted reference patch, and to output the adjusted reference patch;
    a table generator to generate at least one table comprising color component values, as addresses, and storing color component values of the adjusted reference patch as data in the at least one table; and
    a color corrector to address the at least one table, using color component values of the image, to read data corresponding to the color component values of the image and output the read data for a color corrected image,
    wherein the user interface comprises:
    a luminance manipulator to be manipulated by the user to match a luminance of the displayed reference patch with a luminance of a paired displayed background;
    a color component manipulator to be manipulated by the user to remove the non-gray component from the displayed reference patch; and
    an adjusted reference patch generator to generate the adjusted reference patch for the displayed reference patch based on the luminance manipulation and the color component manipulation,
    wherein the color component manipulator comprises:
    a gray balance guide map to represent designators of a plurality of chroma components in different locations on a two-dimensional space; and
    gray balance cursors provided within the displayed reference patch and the gray balance guide map and to be manipulated by the user so as to move the gray balance cursors together an identical distance in an identical direction,
    wherein, as a gray balance cursor within the gray balance guide map gets closer to an arbitrary designator, a chroma component associated with the arbitrary designator is correspondingly removed from the displayed reference patch.

11. The apparatus of claim 10, wherein a pattern of the gray balance cursors within the reference patch is identical to a pattern of the displayed background.

12. A method of correcting color of an image, the method comprising:
    displaying each of N, with N being a number greater than or equal to 1, reference patches selectively overlaid on respective displayed corresponding backgrounds, removing a non-gray component from a selected reference patch, of the N reference patches, according to an interaction by a user and characteristics of a user's visual system, and determining the non-gray component removed reference patch as an adjusted reference patch, wherein the user interaction includes interacting with a user patch manipulator to control display characteristics of the selected reference patch, overlaying a displayed corresponding background, with the user patch manipulator being displayed as an overlay within the displayed selected reference patch;

generating at least one table that has, as addresses, color component values and stores color component values of the adjusted reference patch as data in the at least one table; and addressing the at least one table, using color component values of the image, to read data corresponding to the color component values of the image and outputting the read data for a color corrected image, wherein a plurality of pairs of reference patches and backgrounds are displayed, pair by pair, non-gray components are removed from the displayed reference patches, according to the characteristics of the user's visual system, luminances of the displayed reference patches match with luminances of the displayed backgrounds, according to the characteristics of the user's visual system, as the adjusted reference patches, wherein each of the plurality of pairs includes one predetermined reference patch paired with one predetermined background.

13. The method of claim 12, wherein the outputting of the adjusted reference patches comprises:

initializing a variable n;

displaying a paired nth reference patch and an nth background, together;

removing a non-gray component from the displayed nth reference patch, according to the characteristics of the user's visual system;

determining whether the variable n is equal to N and if it is determined that the variable n is equal to N proceeding to the generating of the at least lookup table, and if it is determined that the variable n is not equal to N increasing the variable n by 1 and proceeding to the displaying of the nth reference patch and the nth background.

14. The method of claim 13, where the outputting of the adjusted reference patches further comprises:

matching a luminance of the nth reference patch with a luminance of the nth background, according to the characteristics of the user's visual system.

15. At least one computer readable medium structure comprising computer readable code to control an implementation of the method of claim 12.

16. An apparatus for correcting color of an image, the apparatus comprising:

a user interface to display each of N reference patches, with N being a number greater than 1, with a user selected reference patch of the N reference patches being displayed together with all N reference patches and concurrently with a separate display of the user selected reference patch overlaid on a corresponding background, to remove a non-gray component from the selected reference patch overlaid on the corresponding background based on user interaction and according to characteristics of a user's visual system, as an adjusted reference patch, and to output the adjusted reference patch;

a table generator to generate at least one table comprising color component values, as addresses, and storing color component values of the adjusted reference patch as data in the at least one table; and a color corrector to address the at least one table, using color component values of the image, to read data corresponding to the color component values of the image and output the read data for a color corrected image, wherein the user interface displays a plurality of paired reference patches and backgrounds, pair by pair, removes non-gray components from the displayed reference patches, according to the characteristics of the user's visual system, matches luminances of the displayed reference patches with luminances of displayed backgrounds, according to the characteristics of the user's visual system, as adjusted references patches, respectively, and outputs the adjusted reference patches, wherein each of the plurality of pairs includes one predetermined reference patch paired with one predetermined background.

17. The apparatus of claim 16, wherein the color component manipulator comprises:

a gray balance guide map to represent designators of a plurality of chroma components in different locations on a two-dimensional space; and gray balance cursors provided within the displayed reference patch and the gray balance guide map and to be manipulated by the user so as to move the gray balance cursors together an identical distance in an identical direction, wherein, as a gray balance cursor within the gray balance guide map gets closer to an arbitrary designator, a chroma component associated with the arbitrary designator is correspondingly removed from the displayed reference patch.

18. The apparatus of claim 17, wherein a pattern of the gray balance cursors within the reference patch is identical to a pattern of the displayed background.

19. The apparatus of claim 16, wherein the user interface comprises:

a luminance manipulator to be manipulated by the user to match a luminance of the displayed reference patch with a luminance of a paired displayed background, as the corresponding overlaid background;

a color component manipulator to be manipulated by the user to remove the non-gray component from the displayed reference patch; and an adjusted reference patch generator to generate the adjusted reference patch for the displayed reference patch based on the luminance manipulation and the color component manipulation.

20. The apparatus of claim 19, wherein the color component manipulator comprises:

a gray balance guide map to represent designators of a plurality of chroma components in different locations on a two-dimensional space; and gray balance cursors provided within the displayed reference patch and the gray balance guide map and to be manipulated by the user so as to move the gray balance cursors together an identical distance in an identical direction, wherein, as a gray balance cursor within the gray balance guide map gets closer to an arbitrary designator, a chroma component associated with the arbitrary designator is correspondingly removed from the displayed reference patch.

21. The apparatus of claim 16, wherein the table generator comprises:

a gamma matcher to match the luminances of N backgrounds, with color component values the image may have, using a gamma function; and a color component matcher to analyze the gamma matcher matching results, match the color components values the image may have with the color component values of the adjusted reference patches, and output the color component value matching results as at least one table.

22. The apparatus of claim 16, wherein the color corrector comprises:

a table reader to address the at least one table, using the color component values of the image, to read the data corresponding to the color component values of the image and output the read data for the color corrected image; and a data generator to, when the at least one table does not include data corresponding to the color component values of the image, predict data corresponding to the color component values using piecewise linear modeling using data from the at least one table, and output results of the prediction for the color corrected image.

23. The apparatus of claim 16, wherein the user interface further comprises two gray balance cursors respectively provided within the displayed reference patch and a gray balance guide map and to be manipulated by the user so as to move the gray balance cursors together an identical distance in an identical direction relative to respective colors mapped in the gray balance guide map.

24. A method of correcting color of an image, the method comprising:

displaying each of N reference patches, with N being a number greater than 1, with a user selected reference patch of the N reference patches being displayed together with all N reference patches and concurrently with a separate display of the user selected reference patch overlaid on a corresponding background, removing a non-gray component from the selected reference patch, according to an interaction by a user and characteristics of a user's visual system, and determining the non-gray component removed reference patch as an adjusted reference patch;

generating at least one table that has, as addresses, color component values and stores color component values of the adjusted reference patch as data in the at least one table; and addressing the at least one table, using color component values of the image, to read data corresponding to the color component values of the image and outputting the read data for a color corrected image, wherein a plurality of pairs of reference patches and backgrounds are displayed, pair by pair, non-gray components are removed from the displayed reference patches, according to the characteristics of the user's visual system, luminances of the displayed reference patches match with luminances of the displayed backgrounds, according to the characteristics of the user's visual system, as the adjusted reference patches, wherein each of the plurality of pairs includes one predetermined reference patch paired with one predetermined background.

25. The method of claim 24, wherein the outputting of the adjusted reference patches comprises:

initializing a variable n;

displaying a paired nth reference patch and an nth background, together;

removing a non-gray component from the displayed nth reference patch, according to the characteristics of the user's visual system;

determining whether the variable n is equal to N and if it is determined that the variable n is equal to N proceeding to the generating of the at least lookup table, and if it is determined that the variable n is not equal to N increasing the variable n by 1 and proceeding to the displaying of the nth reference patch and the nth background.

26. The method of claim 25, where the outputting of the adjusted reference patches further comprises:

matching a luminance of the nth reference patch with a luminance of the nth background, according to the characteristics of the user's visual system.

27. At least one computer readable medium structure comprising computer readable code to control an implementation of the method of claim 24.

* * * * *